(12) United States Patent
Lachman

(10) Patent No.: US 8,474,491 B2
(45) Date of Patent: Jul. 2, 2013

(54) NITROGEN TIRE FILLING APPARATUS AND METHOD

(76) Inventor: Janice Lachman, Lake Mary, FL (US)

(*) Notice: Subject to any disclaimer, the term of this patent is extended or adjusted under 35 U.S.C. 154(b) by 372 days.

(21) Appl. No.: 12/927,098

(22) Filed: Nov. 8, 2010

(65) Prior Publication Data

US 2011/0247723 A1 Oct. 13, 2011

Related U.S. Application Data

(60) Provisional application No. 61/342,208, filed on Apr. 12, 2010.

(51) Int. Cl.
*B65B 31/00* (2006.01)
*B29C 73/16* (2006.01)

(52) U.S. Cl.
CPC .................... *B29C 73/166* (2013.01)
USPC ................ 141/38; 141/105; 141/192

(58) Field of Classification Search
USPC ........................... 141/38, 192, 105
See application file for complete search history.

(56) References Cited

U.S. PATENT DOCUMENTS

| 1,389,314 | A | * | 8/1921 | McMullin | 137/355.18 |
|---|---|---|---|---|---|
| 3,255,771 | A | * | 6/1966 | MacSpadden | 137/355.12 |
| 3,468,348 | A | * | 9/1969 | Sperberg | 141/1 |
| 4,275,860 | A | * | 6/1981 | Brabazon | 244/135 R |
| 5,891,277 | A | * | 4/1999 | Bachhuber | 152/415 |
| 6,152,192 | A | * | 11/2000 | Klotz et al. | 141/18 |
| 6,155,313 | A | * | 12/2000 | Smalley | 141/38 |
| 6,170,542 | B1 | * | 1/2001 | Loureiro Benimeli | 141/192 |
| 6,189,299 | B1 | * | 2/2001 | Brown et al. | 53/512 |
| 7,624,774 | B2 | * | 12/2009 | Lighter | 141/237 |
| 8,091,590 | B2 | * | 1/2012 | Graham | 141/38 |

* cited by examiner

*Primary Examiner* — Timothy L Maust
(74) *Attorney, Agent, or Firm* — William M. Hobby, III

(57) ABSTRACT

An apparatus is provided for filling vehicle tires with nitrogen and especially to a customer operated tire inflation system for filling vehicle balloon tires with nitrogen. A plurality of tanks of nitrogen are mounted for rotation on a lazy susan and are connected to a hose on a reel having a tire filling valve on the end thereof for unreeling and filling a vehicle tire. A credit or debit card reader controls a hose reel lock and flow from the nitrogen tanks.

8 Claims, 3 Drawing Sheets

NITROGEN TIRE FILLING APPARATUS AND METHOD

This application claims the benefit of U.S. Provisional Application No. 61/342,208, filed Apr. 12, 2010.

BACKGROUND OF THE INVENTION

The present invention is generally directed towards an apparatus for filling vehicle tires with nitrogen and especially to a customer operated tire inflation system for filling vehicle balloon tires with nitrogen.

Automobile and truck tires are commonly filled with compressed air to a predetermined pressure level at vehicle service stations or the like. Keeping vehicle tires at the proper pressure as recommended by the vehicle manufacturer prolongs the life of the tires as well as increases the fuel economy of the vehicle. Balloon tires filled with air commonly loose a small amount of air and need to be checked at regular intervals.

Recently, it has been known to fill vehicle tires with nitrogen gas rather than air in order to improve fuel consumption and to prolong the life of the tire. Atmospheric air is comprised of slightly less than 80% nitrogen and slightly more than 20% oxygen but also contains water vapor and minute amount of other gases. Filling a tire with a higher purity nitrogen instead of air improves the vehicle mileage and prolongs the life of the tire. Inert nitrogen is heavier than oxygen and reduces the loss of gas from the tire over a period of time and reduces the water vapor within the tire. Fill frequency and safety are significant benefits. Oxygen at high temperatures and pressures can oxidize metals in the tire as well as the rubber which can result in additional leakage while dry nitrogen does not corrode the metal or the tire rubber. Overall, the use of nitrogen rather than air promotes safety and the longer life of the tire while reducing fuel consumption rates and tire maintenance. Common present day tire facilities sometimes have means for filling vehicle tires with nitrogen but such systems are generally not available at local service stations and are not consumer operated. It is the aim of the present invention to provide a system for filling vehicle tires with nitrogen which is consumer operated.

SUMMARY OF THE INVENTION

The present invention is directed towards a system for filling vehicle tires with nitrogen and especially to a customer operated tire inflation system for filling vehicle balloon tires with nitrogen and to a method of filling a vehicle tire with nitrogen. The apparatus for filling a vehicle tire with nitrogen has a housing and a plurality of nitrogen holding tanks rotatably supported on a lazy susan platform in the housing. A reeled hose is operatively connected to the plurality of tanks for feeding nitrogen therefrom and has a tire filling valve on the end thereof. An electrically operated solenoid flow valve is coupled to the hose to control the flow of nitrogen therethrough and solenoid hose lock releasably locks the hose against release from the reel. Valve control means actuate the electrically operated flow valve to control the flow of nitrogen from the nitrogen holding tanks through the hose and release the hose reel lock so that a vehicle tire can be filled with nitrogen responsive to actuating the electrically operated valve to release nitrogen from the nitrogen holding tanks. The electrically operated flow valve and reel lock are actuated by swiping a credit/debit card through a credit/debit card mechanism or by the insertion of coins or bills or the like. The nitrogen flow valve control means uses a CPU and includes a timer for controlling the flow of nitrogen for a predetermined time once the electrically operated valve is actuated. A swivel joint in the connection between the nitrogen tanks and the reeled hose allows the plurality of nitrogen tanks to rotate on the lazy susan.

A method of filling a vehicle tire with nitrogen selects the apparatus for filling a vehicle tire with nitrogen having a plurality of nitrogen holding tanks rotatably supported on a lazy susan platform and a reeled hose operatively connected thereto through a swivel valve. The reeled hose has a tire filling valve on the end thereof. The hose has a solenoid flow valve therein for controlling the flow of nitrogen therethrough and the reeled hose has a solenoid lock for releasably locking the reel. A credit/debit card actuating mechanism is interconnected to operate the reel lock and the solenoid flow valve to control the flow of nitrogen therethrough.

The process includes positioning a vehicle adjacent the selected apparatus and swiping a credit/debit card in the credit card actuating mechanism or the insertion of coins or bills to release the solenoid lock to release the hose reel in order to extend the hose therefrom and to open the flow valve to release nitrogen under pressure into the hose. The tire filling valve on the end of the hose is then placed on a vehicle tire valve stem to fill the tire with nitrogen from the plurality of nitrogen tanks so that a person can add nitrogen to a vehicle tire. The method includes the step of timing the length of time the solenoid flow valve is open to control the flow of nitrogen from the plurality of nitrogen tanks.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
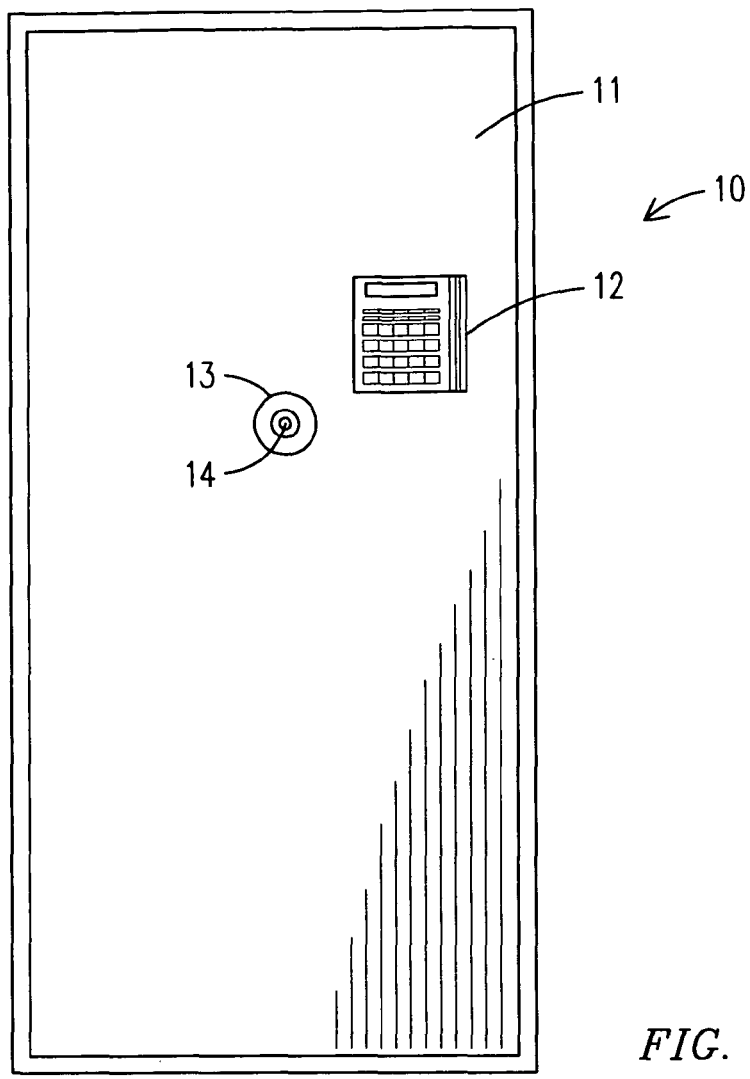
FIG. 1 is a front elevation of a nitrogen tire filling system in accordance with the present invention.
Figure 2:
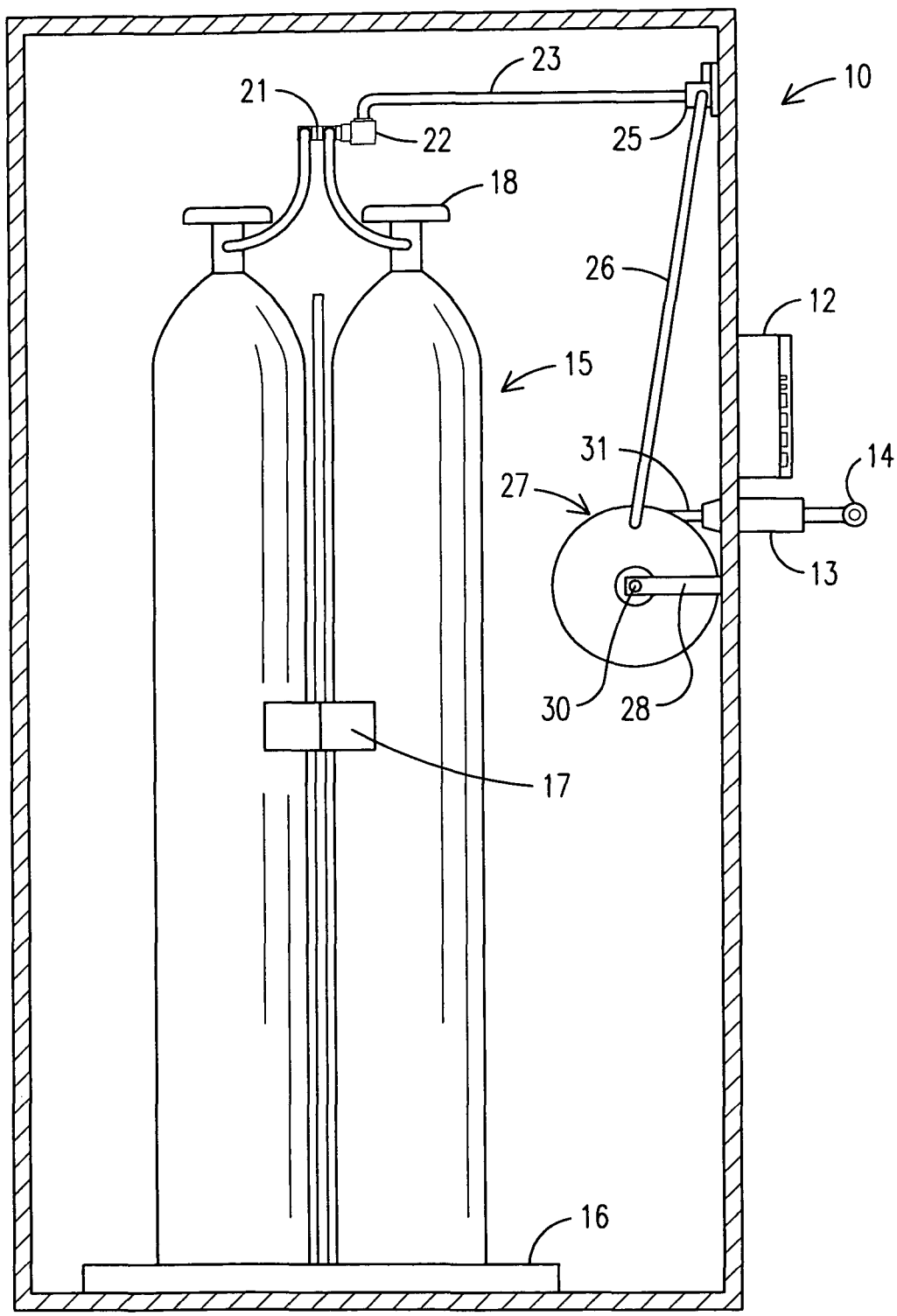
FIG. 2 is a sectional view taken through the tire filling machine of FIG. 1.
Figure 3:
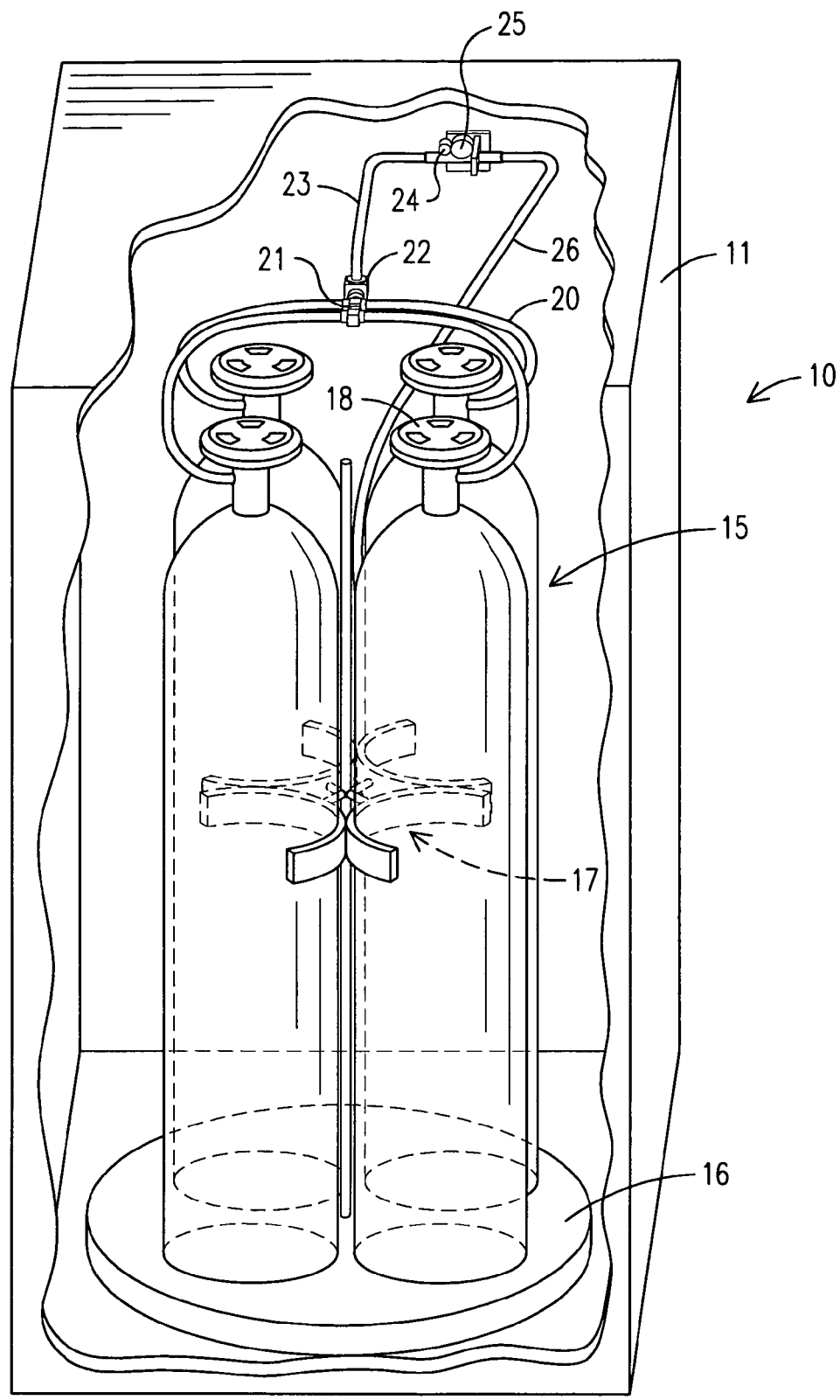
FIG. 3 is a broken away, perspective view of the tire filling apparatus of FIGS. 1 and 2.

Referring to the drawings of FIGS. 1 through 3, a nitrogen tire filling apparatus 10 has an outer housing 11 which, as seen in FIG. 1, has a credit card swiping mechanism and has a hose guide 13 having a pressure filling nozzle 14 on the end thereto. The housing 11 has a plurality of pressurized nitrogen gas tanks 15 mounted therein and resting on a lazy susan platform 16 and supported by the tank positioning brackets 17. Thus, the tanks 15 can be rotated on the lazy susan platform 16 to position each tank for changing an empty tank for a filled tank of pressurized nitrogen. Each nitrogen tank 15 has a valve 18 for releasing the pressurized gas and each nitrogen tank has a copper tube 20 connected to the outlet thereof with all four tubes 20 leading to a T-connector 21 which is connected to a swivel joint 22. This arrangement allows the tanks 15 riding on the lazy susan platform to rotate while maintaining their common connection through the pipes 20 with their swivel connection 22, allowing the rotation of the tanks. A copper tube 23 is connected from the swivel joint 22 and connects to a duel stage pressure regulator 24 and to a solenoid valve 25.

Actuation of the solenoid valve 25 allows pressurized nitrogen gas to pass through the copper tube 26 which connects into the side of a hose reel 27, as seen in FIG. 2. The hose reel 27 is mounted with brackets 28 to one side of the housing 11 and has an axle pin 30 allowing the spring loaded reel therein supporting the high pressure hose 31 to be reeled out through a hose guide 13. The pipe 26 is connected to the end of the reeled hose. The hose guide 13 also contains a solenoid for locking the hose in place in its return or rest position.

In operation, a customer can pull his vehicle adjacent the nitrogen tire filling machine 10 and swipe his credit card in the credit card swipe 12 or insert coins or bills which will release the hose 31 from the housing 11 to allow the hose to be reeled out to a tire. Simultaneously, the tire swipe machine will open the solenoid 25 to release pressurized nitrogen from the four tanks 15 for a predetermined time period, such as three minutes, giving the consumer that amount of time to fill his tires with pressurized nitrogen.

Figure 4:
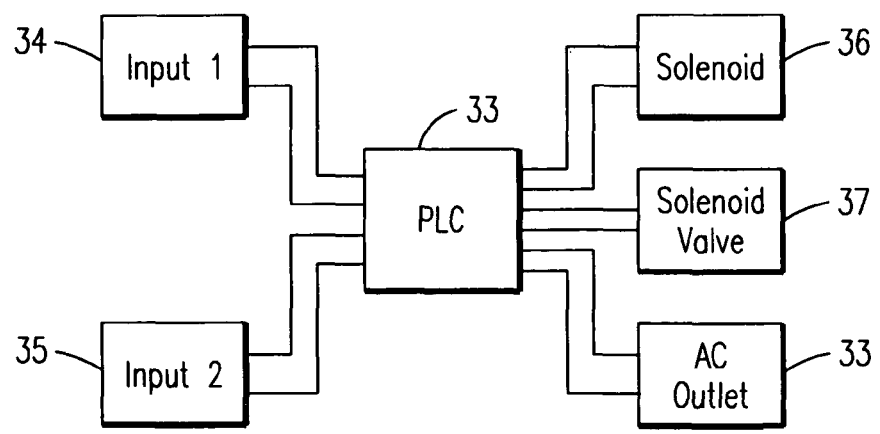
FIG. 4 is a block diagram of the operation of the vehicle tire filling machine of the present invention.

Turning to FIG. 4, a block diagram of the operation of the nitrogen tire filling machine is illustrated which operates with a programmable logic controller (PLC) 33. The PLC has an input 34 which is credit card activated and an input 35 which checks for the hose 31 returned onto the hose reel. The PLC in turn releases the solenoid valve 36 which releases the solenoid lock and allows the hose reel to be pulled from the reel and also opens the solenoid valve 37 to release the nitrogen for a predetermined period of time, such as three minutes. The PLC also locks the hose reel closed when it is returned back onto the spring-loaded reel. Solenoids to the AC outlet 38 are connected to the PLC and solenoids. The programmable logic 33 continuously checks the input 34. When the input 34 is on, the outputs 36 and 37 are turned on. Output 36 can remain open for 180 seconds. The PLC timer will turn off the solenoid valve 37 and relock the solenoid hose 36 for the next customer.

A method for filling a vehicle tire with nitrogen with the present apparatus includes selecting the apparatus 10 herein for filling a vehicle tire with nitrogen which apparatus has a plurality of nitrogen tanks 15 rotatably supporting on a lazy susan platform 16. The hose 31 on the hose reel has a tire filling valve 14 on the end thereof and has a solenoid 25 controlling the flow of nitrogen from the nitrogen tanks 15 and a hose reel locking solenoid 36 in the hose guide 13. A credit/debit card actuating mechanism 12 actuates the solenoids 36 and 37 responsive to a person swiping their card. The process includes positioning a vehicle adjacent the apparatus 10, swiping a credit/debit card or inserting coins or bills in the actuating mechanism 12 to release the solenoid reel lock 36 to release the reeled hose and open the solenoid flow valve 25 to release nitrogen into the hose 31. The tire filling valve 14 is placed on vehicle tire valve stem to fill the tire with nitrogen from the nitrogen tanks 15 so that a person can add nitrogen to a vehicle tire. The method includes timing the length of time that the nitrogen is allowed to flow from the tanks 15.

It should be clear that a nitrogen tire filling system has been provided which can be utilized directly by an individual consumer to fill his tires with pressurized dry nitrogen rather than compressed air and to a method of filling a vehicle tire with nitrogen. It should also be clear that a coin mechanism can be utilized in place of a credit or debit card without departing from the spirit and scope of the invention. The present invention should however not be construed as limited to the forms shown which are to be considered illustrative rather than restrictive.

I claim:

1. An apparatus for filling a vehicle tire with nitrogen comprising:

a housing;
a plurality of nitrogen holding tanks supported on a lazy susan in said housing for rotation thereon;
a plurality of tubes, each tube being connected to one of said plurality of nitrogen holding tanks for releasing nitrogen therethrough;
a hose connected to each of said plurality of tubes for receiving nitrogen from said plurality of nitrogen holding tanks, said hose having a tire filling valve on the end thereof;
a hose reel mounted in said housing and having a portion of said hose reeled thereon;
an electrically operated flow valve coupled to said hose for controlling the flow of nitrogen therethrough;
valve control means for actuating said electrically operated flow valve to control the flow of nitrogen from said plurality of nitrogen holding tanks through said hose; and
hose locking means for releasably locking said hose against release from said reel;
whereby a vehicle tire can be filled with nitrogen responsive to actuating said electrically operated valve to release nitrogen from said nitrogen holding tanks.

2. The apparatus for filling a vehicle tire with nitrogen in accordance with claim 1 in which said electrically operated flow valve is credit card actuated with a credit card mechanism.

3. The apparatus for filling a vehicle tire with nitrogen in accordance with claim 2 in which hose locking means includes a solenoid hose lock.

4. The apparatus for filling a vehicle tire with nitrogen in accordance with claim 3 in which said valve control means includes timing means for controlling the flow of nitrogen for a predetermined time once said electrically operated valve is actuated.

5. The apparatus for filling a vehicle tire with nitrogen in accordance with claim 3 in which said valve control means includes a CPU.

6. The apparatus for filling a vehicle tire with nitrogen in accordance with claim 1 in which said hose includes a swivel joint, allowing said plurality of nitrogen tanks to rotate on in said housing.

7. A method of filling a vehicle tire with nitrogen comprising the steps of:

selecting an apparatus for filling a vehicle tire with nitrogen having a plurality of nitrogen holding tanks supported on a lazy susan for rotation thereon, each nitrogen holding tank having a tube coupled thereto for releasing nitrogen therethrough, each said tube being coupled to a reeled hose having a tire filling valve on the end thereof, said apparatus having a solenoid flow valve therein for controlling the flow of nitrogen from said plurality of nitrogen tanks, said reeled hose having a solenoid lock for releasably locking said reel in a reeled-in position and a credit card actuating mechanism interconnected to operate said reeled hose lock and said solenoid flow valve to control the flow of nitrogen therethrough;
positioning a vehicle adjacent said apparatus;
swiping a credit card in said credit card actuating mechanism to release said solenoid lock to release said reeled hose and unlock said solenoid flow valve to release nitrogen flow through said hose; and
placing said tire filling valve onto a vehicle tire valve stem to fill said tire with nitrogen from said plurality of nitrogen tanks;
whereby a person can add nitrogen to a vehicle tire.

8. A method of filling a vehicle tire with nitrogen in accordance with claim 7 including the step of actuating a timer to control the length of time the solenoid flow valve is open to control the flow of nitrogen from said plurality of nitrogen tanks.

\* \* \* \* \*